United States Patent [19]
Ueda

[11] Patent Number: 5,631,637
[45] Date of Patent: May 20, 1997

[54] OUTPUT METHOD FOR DOT DATA AND APPARATUS THEREFOR

[75] Inventor: Shigeru Ueda, Wako, Japan

[73] Assignee: Canon Kabushiki Kaisha, Tokyo, Japan

[21] Appl. No.: 547,914

[22] Filed: Oct. 25, 1995

Related U.S. Application Data

[63] Continuation of Ser. No. 13,735, Feb. 4, 1993, abandoned.

[30] Foreign Application Priority Data

Feb. 5, 1992 [JP] Japan .................. 4-020262

[51] Int. Cl.$^6$ .................................. H04B 7/00
[52] U.S. Cl. .................. 340/870.28; 340/827; 400/73; 364/708.1
[58] Field of Search .................. 340/825.02, 825.03, 340/827, 870.28; 400/73, 88, 103; 235/432; 364/405, 708.1, 408; 395/114, 112; 318/404, 444

[56] References Cited

U.S. PATENT DOCUMENTS 5,075,874  12/1991  Steeves et al. .................. 395/112
5,131,078  7/1992   Ikenoue .......................... 395/114
5,418,891  5/1995   Yang ............................. 395/114
5,467,434  11/1995  Hower, Jr. et al. ............... 395/112

FOREIGN PATENT DOCUMENTS

| 356104 | 2/1990 | European Pat. Off. | G06K 15/02 |
| 389261 | 9/1990 | European Pat. Off. | G11B 31/00 |
| 286328 | 12/1987 | Japan | H04B 7/00 |
| 10899 | 1/1988 | Japan | H04Q 9/00 |
| 20077 | 1/1992 | Japan | H04N 5/225 |
| 202918 | 7/1992 | Japan | E02F 9/20 |
| 319467 | 11/1992 | Japan | B41J 29/000 |
| 155110 | 6/1993 | Japan | B41J 29/38 |
| 87-04280 | 7/1987 | WIPO | G06F 33/12 |

*Primary Examiner*—Glenton B. Burgess
*Attorney, Agent, or Firm*—Fitzpatrick, Cella, Harper & Scinto

[57] ABSTRACT

A data output apparatus is equipped with a wireless data receiving unit, for wireless data reception from an external equipment, and a cable data receiving unit for data reception, through a cable, from the external equipment, and is capable of automatically selecting the data received by the cable data receiving unit when a cable is connected thereto, thereby dispensing with the trouble of switching the receiving units and connecting or disconnecting the cable.

44 Claims, 7 Drawing Sheets

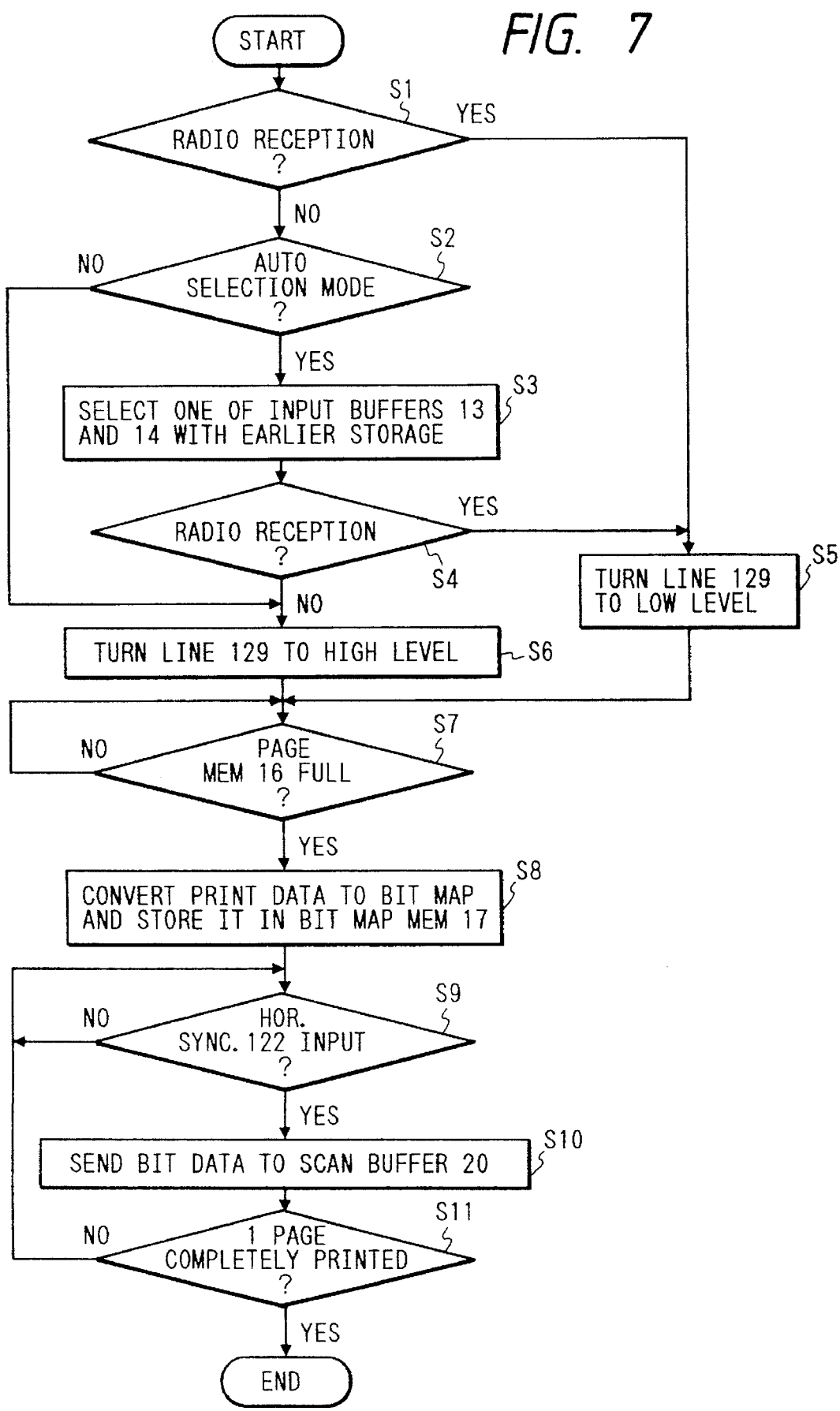

OUTPUT METHOD FOR DOT DATA AND APPARATUS THEREFOR

This application is a continuation, of Application No. 08/13,735 filed Feb. 4, 1993, now abandoned.

BACKGROUND OF THE INVENTION

1. Field of the Invention

The present invention relates to an output method for dot data, enabling transmission and reception of data by cable or wireless, and an apparatus therefor.

2. Related Background Art

There has been developed a printer capable of data printing by receiving the printing data by a cable or by wireless from a host computer. In such printer, a wireless transmission/reception unit is constructed detachably from the main body of the printer, and is connected in front of a unit for transmission/reception by a cable. When said printer receives the printing data from the host computer through the cable transmission/reception unit, said wireless transmission/reception unit is detached from the main body, and the cable transmission/reception unit is directly connected to an interface cable from the host computer.

Such prior technology has been associated with the following drawbacks:

(1) At the switching from the cable transmission mode to the wireless transmission mode, the wireless transmission/reception unit has to be mounted on the main body, and in such mounted state, the cable transmission/reception by direct cable connection of the host computer and the cable transmission/reception unit is inhibited:

(2) Also when the wireless transmission/reception unit is detached and the interface cable is not connected to the cable transmission/reception unit, the printing data cannot be received from the host computer. Consequently, when the wireless reception of the printing data cannot be conducted for example due to an unfavorable air condition, it has been necessary to detach the wireless transmission/reception unit from the main body and to connect the interface cable for cable transmission. Also when the wireless reception becomes possible due to a favorable air condition, it has been necessary to connect the wireless transmission/reception unit on the main body.

SUMMARY OF THE INVENTION

In consideration of the foregoing, an object of the present invention is to provide an output method employing a transmission/reception unit capable of wireless transmission/reception and a transmission/reception unit capable of cable transmission/reception, and capable of automatically determining the reception unit to be used according to whether a cable is connected to the cable transmission/reception unit, and an output apparatus therefor.

Another object of the present invention is to provide an output method capable of selecting either the wireless reception or the cable reception when the cable is connected, and an apparatus therefor.

Still another object of the present invention is to provide an output apparatus for receiving data from an external equipment, comprising wireless data reception means for wireless data reception from the external equipment, cable data reception means for cable data reception from the external equipment, and selection means for selecting the data received by said cable data reception means when a cable is connected to said cable data reception means.

Still another object of the present invention is to provide an output method for receiving data from an external equipment, capable of selecting data received from a cable data reception unit for receiving data from the external equipment through a cable, when a cable is connected to said cable data reception unit.

Still another object of the present invention is to provide an output apparatus comprising wireless data reception means for wireless data reception from an external equipment, and cable data reception means for cable data reception from the external equipment, and adapted to select the data received by said cable data reception means when a cable is connected thereto.

Still another object of the present invention is to provide an output apparatus capable of selecting either one of the wireless reception or the cable reception, when a cable is connected.

Still another object of the present invention is to provide an output method, capable of automatically selecting a transmission/reception unit, according to the transmission/reception unit employed in the previous data transmission, and an apparatus therefor.

Still another object of the present invention is to provide an output apparatus capable of displaying, for visual recognition by the user, the transmission/reception unit employed in the data transmission, and a method therefor.

BRIEF DESCRIPTION OF THE DRAWINGS

FIG. 7 is a flow chart showing the control sequence of a main control unit of the printer control unit of the laser beam printer constituting an embodiment of the present invention.

DETAILED DESCRIPTION OF THE PREFERRED EMBODIMENTS

Now the present invention will be clarified in detail by preferred embodiments thereof shown in the attached drawings.

Figure 2:
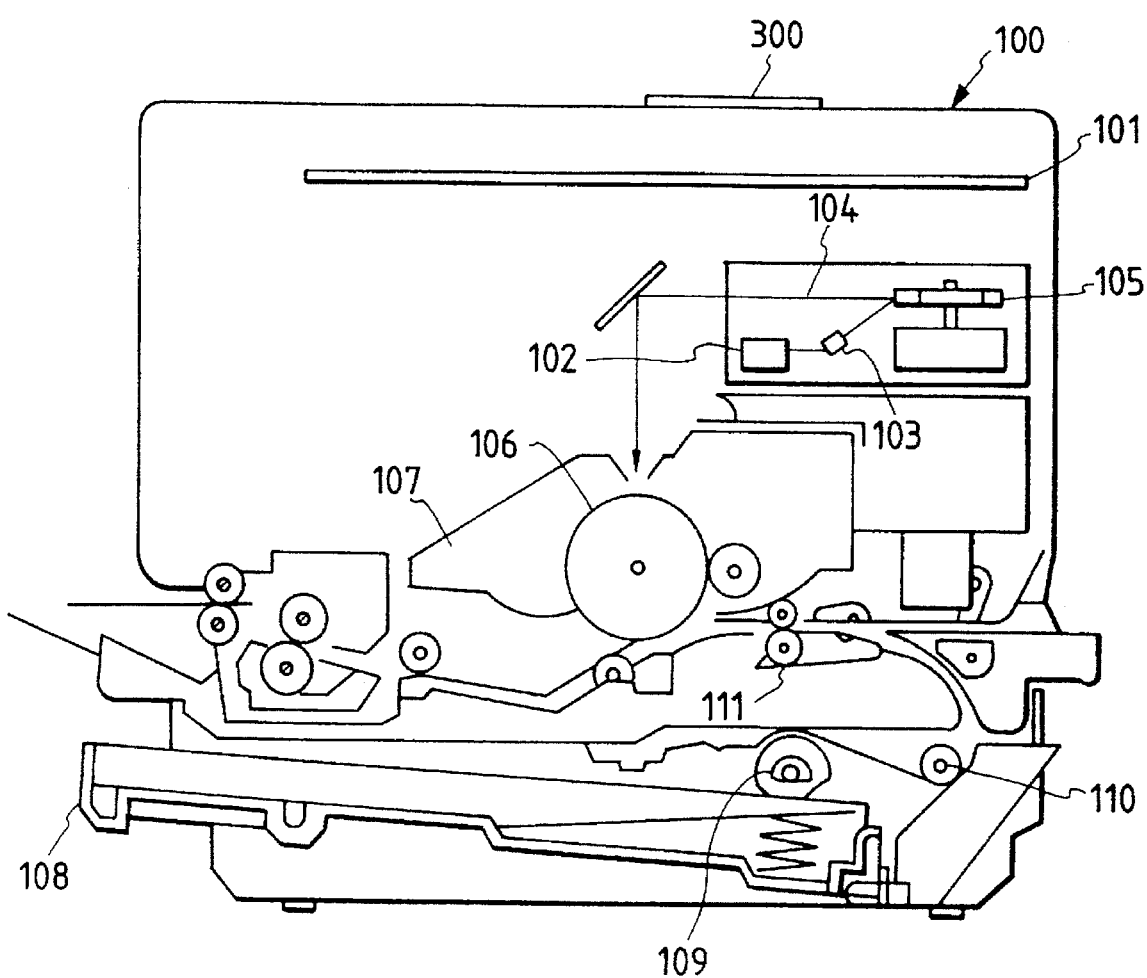
FIG. 2 is a cross-sectional view of a laser beam printer constituting an embodiment of the present invention.

FIG. 2 is a cross-sectional view showing the internal structure of an ordinary laser beam printer (LBP), in which character patterns and fixed form data can be registered from an unrepresented data source, such as a host computer.

The LBP 100 can receive and memorize character information (character codes), form information and macro instructions for example from an externally connected host computer, generate character patterns and form patterns according to these information, and form an image on a recording sheet. There are also provided an operation panel 300 including switches, LED's etc. for operation, and a printer control unit 101 for controlling the entire printer 100 and analyzing the character information etc. supplied from the host computer. Said printer control unit 101 principally converts the character information into a video signal of corresponding character patterns, for supply to a laser driver 102.

The laser driver on-off drives a semiconductor laser 103 according to the entered video signal. The laser beam is laterally deflected and scans an electrostatic drum 106, thereby forming an electrostatic latent image of character patterns, which is developed by a developing unit 107 provided around the drum 106, and is transferred onto a recording sheet. Said recording sheets, in cut form, are contained in a cassette loaded in the LBP 100, fed in succession by a feed roller 109 and transport rollers 110, 111 and supplied to the electrostatic drum 106.

Figure 1:
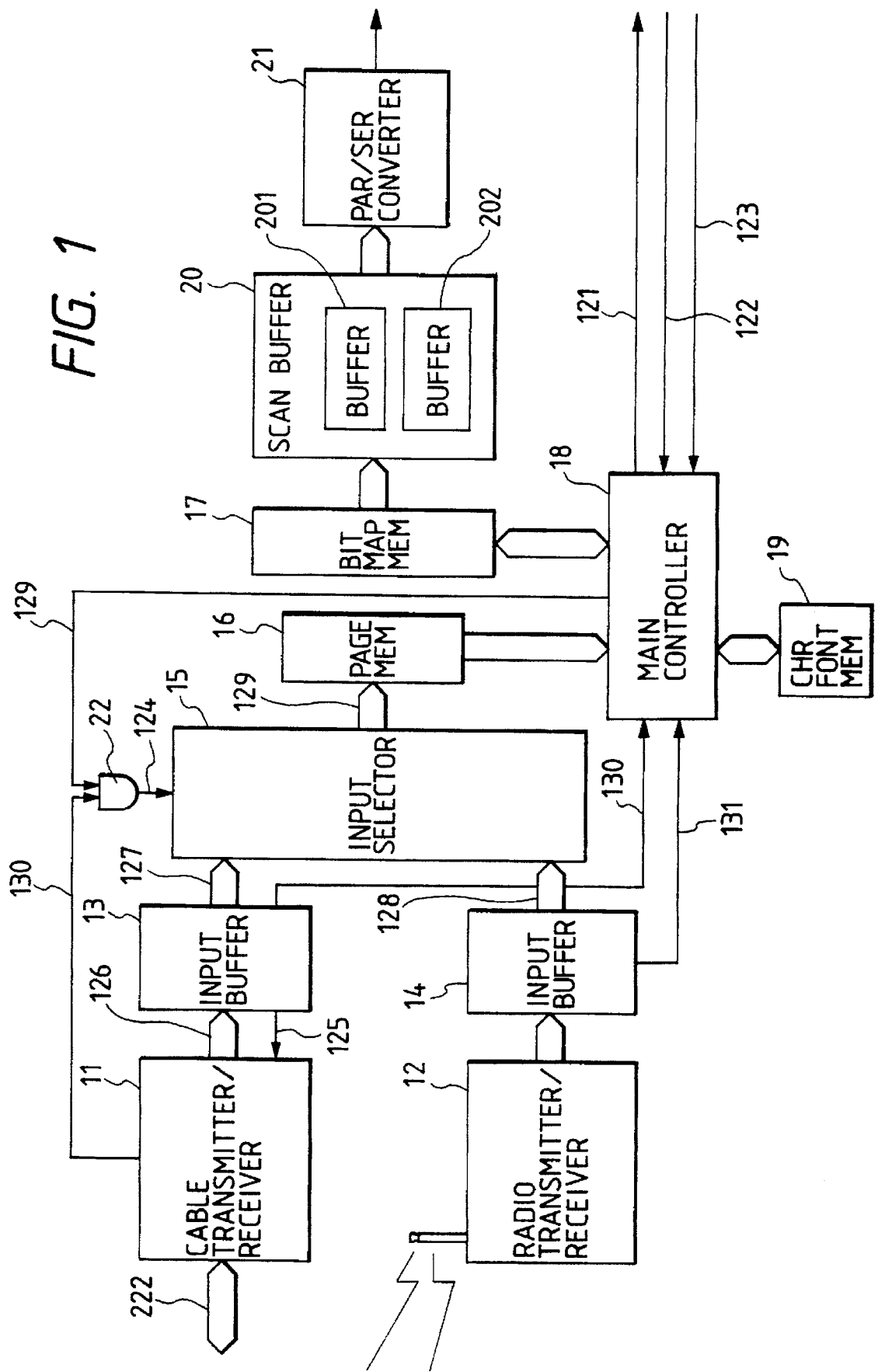
FIG. 1 is a partial block diagram of a printer control unit of a laser beam printer, constituting an embodiment of the present invention.

FIG. 1 is a partial block diagram of a printer control unit 101 of the LBP 100 of the present embodiment.

There are provided a cable transmission/reception unit 11 for receiving printing data from an unrepresented host computer or the like through an interface cable; a wireless transmission/reception unit 12 for wireless reception of the printing data from said host computer or the like; input buffers 13, 14 for storing the printing data respectively entered from the cable transmission/reception unit 11 and the wireless transmission/reception unit 12; an input selector 15 for selecting the cable reception data from the input buffer 13 or the wireless reception data from the input buffer 14 for supply to a page memory 16, respectively when a signal 124 from an AND gate 22 is at the high-level state or at the low-level state; a page memory 16 for storing the printing data in the unit of a page; and a bit map memory 17 for storing bit-developed image data, obtained from character codes stored in the page memory 16 by referring to a character font memory 19.

A control unit 18, for controlling the entire printer control unit 101, controls the processing of printing data including the aforementioned character codes, form information and macro instructions, and also control the printing process. A character font memory 19 memorizes character patterns in bit map data format, corresponding to character codes. A scan buffer 20 is comprised of two buffers 201, 202 constituting a so-called double buffer, in which data from the bit map memory 17 are stored in a buffer while the other releases data. A parallel-serial converter 21 converts the parallel data, read from the scan buffer 20, into serial data, which are utilized for driving a semiconductor laser 103.

Figure 3:
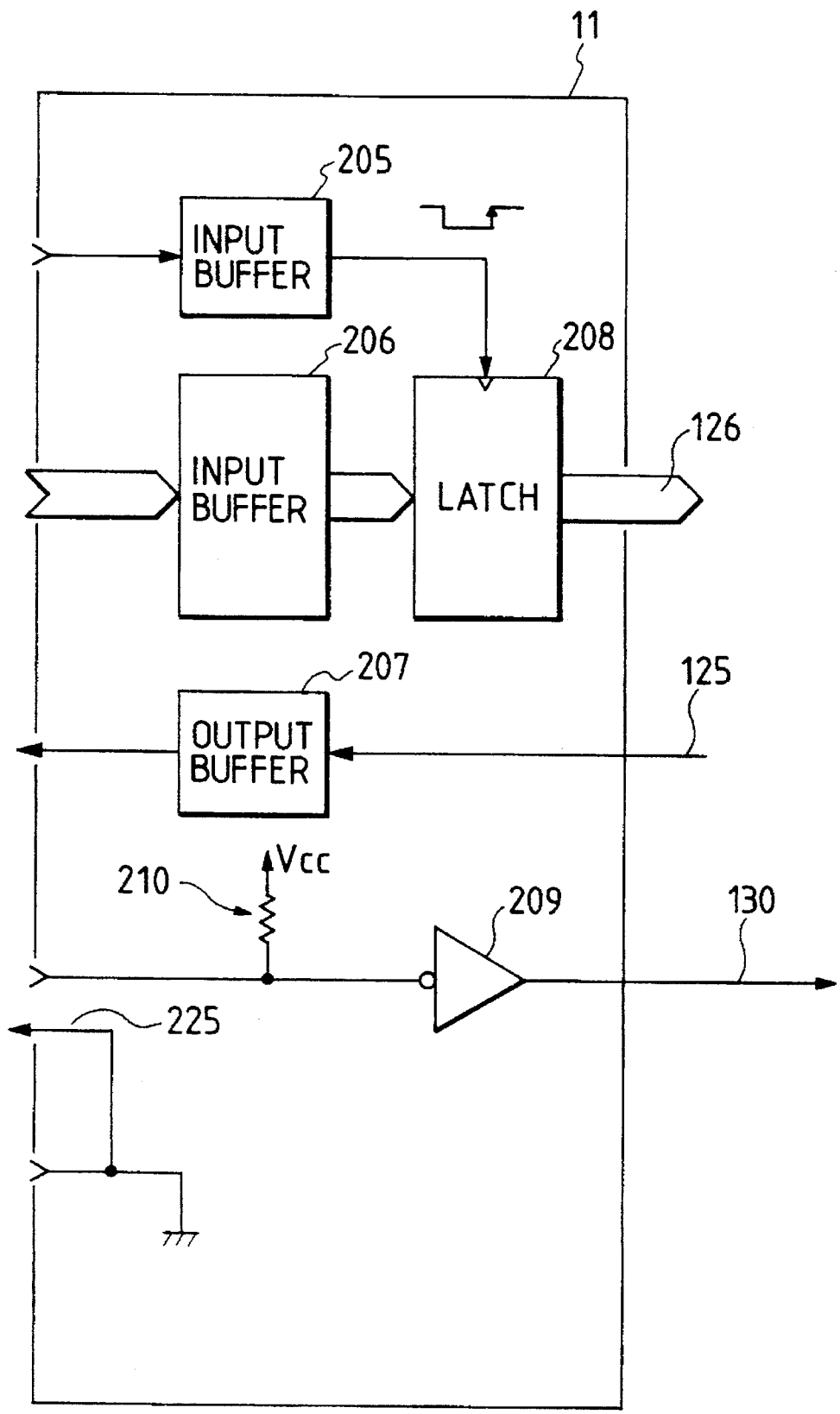
FIG. 3 is a block diagram of a cable transmission/reception unit of the laser beam printer of said embodiment.

FIG. 3 is a detailed circuit diagram of the cable transmission/reception unit 11 in the LBP 100 of the present embodiment.

In FIG. 3 there are provided input buffers 205, 206; a latch circuit 208 for latching the printing buffer; an inverter circuit 209; and an output buffer 207. FIG. 3 shows a state in which the cable transmission/reception unit 11 is not connected to the unrepresented host computer through the interface cable.

In this state, the input of the inverter circuit 209 is pulled up to a high level state by a pull-up resistor 210, whereby said inverter circuit 209 provides a low-level output signal 130. Said signal 130 is supplied to the aforementioned AND gate 22, whereby the signal 124 is shifted to the low-level state and the input selector 105 selects the wireless reception data from the input buffer 14. Thus, when the printing data are transmitted by wireless transmission from the unrepresented host computer, said data are supplied through the input buffer 14 and stored in the page memory 16.

When the printing data of a page are stored in the page memory 16, the main control unit 18 reads said printing data from the page memory 16, then obtains dot pattern data by referring to the character font memory 19 and develops the obtained data in the bit map memory 17. When the printing data of a page are developed in the bit map memory 17, the main control unit 18 sends a printing start signal 121 to a printing mechanism shown in FIG. 2. Said printing mechanism is of so-called raster scanning type, such as a laser beam printer, and releases a horizontal synchronization (BD) signal 122 and a vertical synchronization signal 123 when the printing operation is enabled. The main control unit 18 controls the data write-in and read-out in and from the scan buffer 21 in synchronization with said signals 122, 123. Said scan buffer 21 is composed of buffers 201, 202 of a respective capacity corresponding to dot patterns of a scanning line, functioning so-called double buffers in which printing data are read from one of the buffers and are sent to the printing mechanism while the printing data of a next line are written into the other buffer. The printing dot data, read from said scan buffer 21 are converted, by the parallel-serial converter 21, into serial data and supplied to the printing mechanism.

Figure 4:
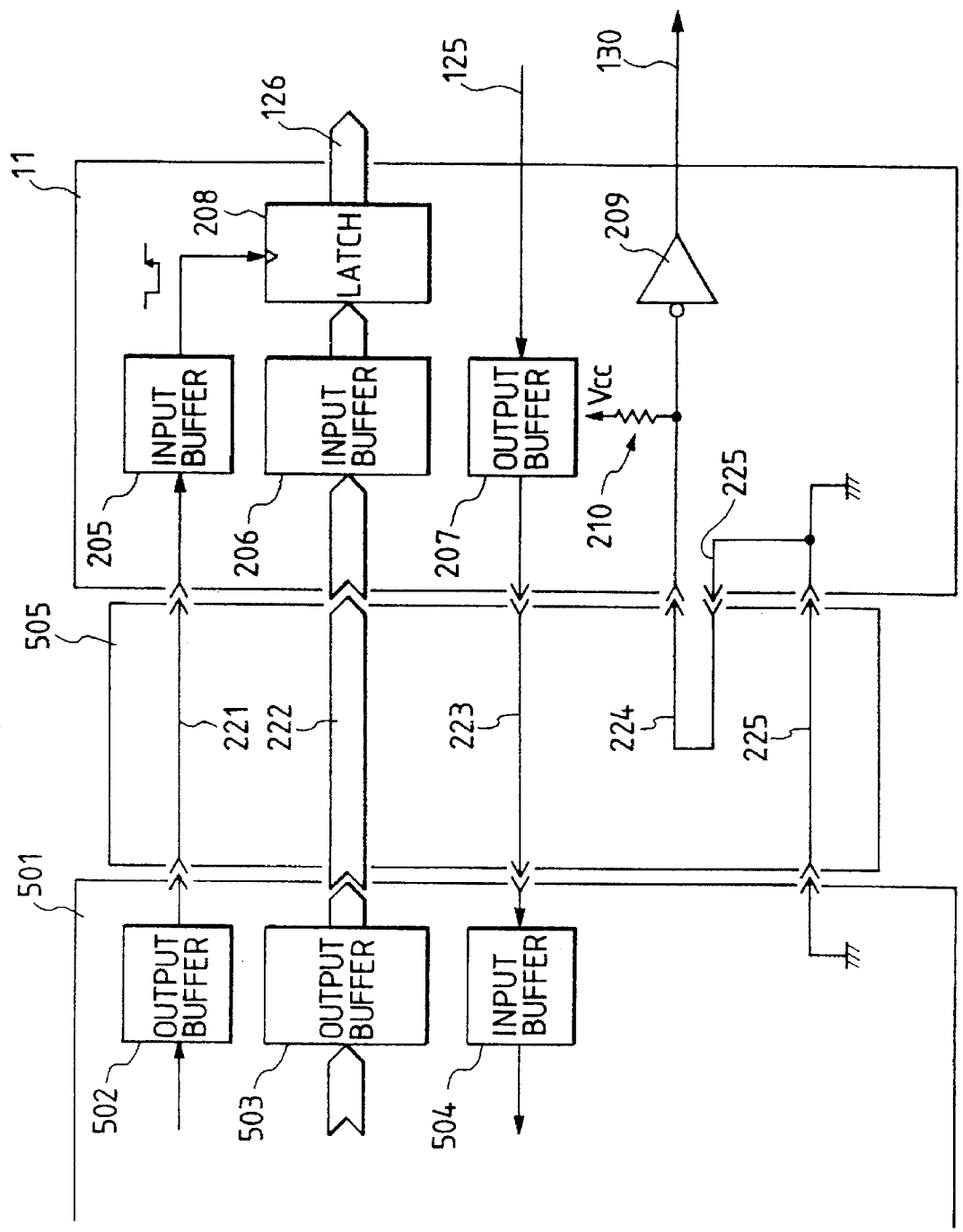
FIG. 4 is a view showing the circuit configuration when a cable is connected to the cable transmission/reception unit of the laser beam printer of said embodiment.

FIG. 4 shows a state in which the cable transmission/ reception unit 11 is connected to the interface cable of the host computer, wherein same components and signals as those in FIG. 3 are represented by same numbers.

In FIG. 4 there are shown an output interface 501 of the host computer, with output buffers 502, 503 and an input buffer 504, and an interface cable 505. As will be apparent from FIG. 4, when the interface cable 505 is connected, a signal line 224 is short-circuited with a ground line GND in the cable 505, whereby the output signal 130 of the inverter 209 assumes a high-level state. Therefore, at the data input, when the main control unit 18 shifts the signal line 129 to the high-level state, the AND gate 22 releases a high-level output and the input selector 15 selects the data from the input buffer 13 for supply to the page memory 16. Thus, when the interface cable with the host computer is connected to the cable transmission/reception unit 11, the printing data received through said unit 11 are automatically selected and printed.

Figure 5:
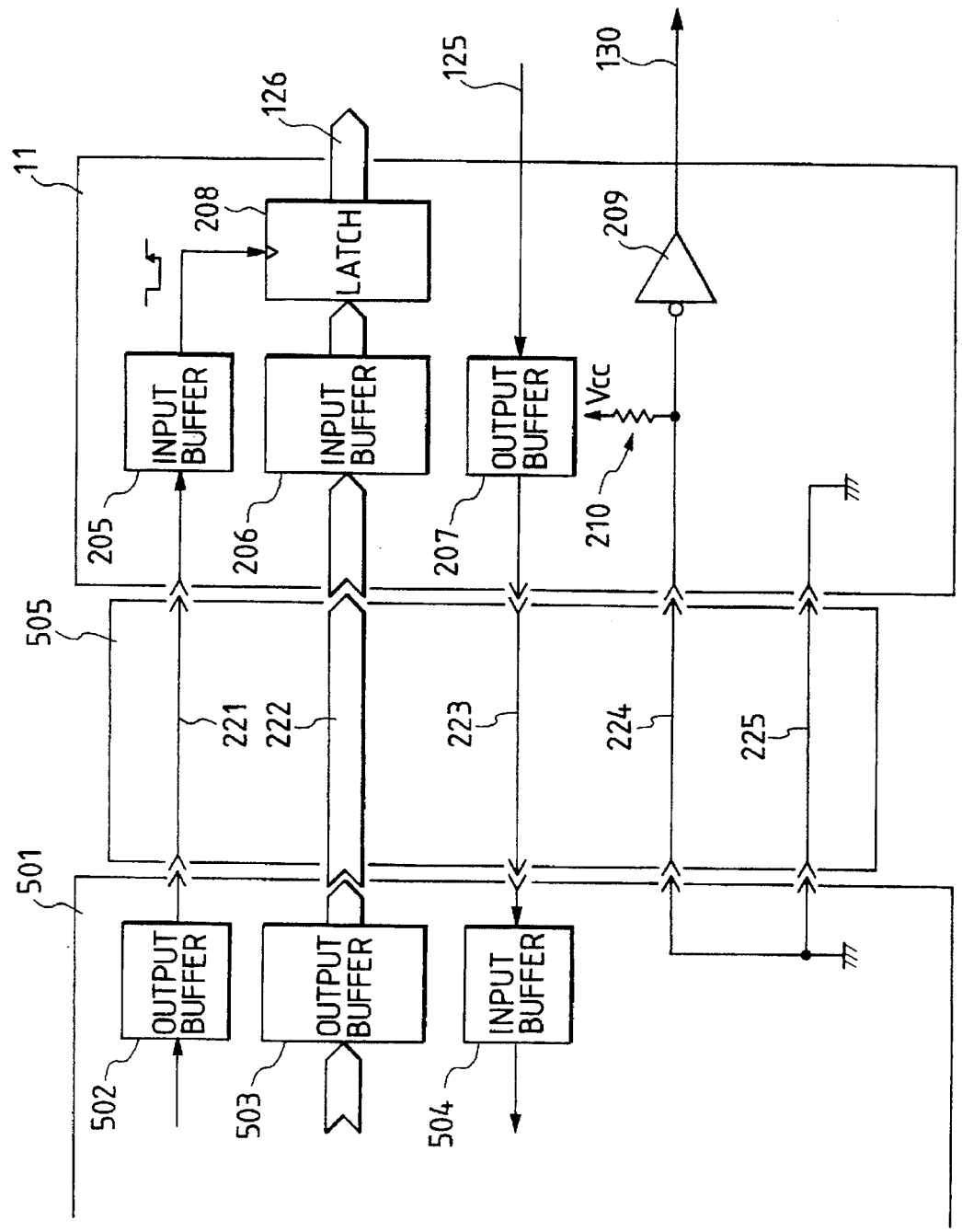
FIG. 5 is a view showing the circuit configuration when a cable is connected to the cable transmission/reception unit of another embodiment of the present invention.

FIG. 5 is a block diagram showing a modification of this embodiment, wherein same components as those in FIG. 4 are represented by same numbers and will not be explained further. In this case, instead of short-circuiting to the ground line GND in the interface cable 505, there is utilized one of the ground lines in said cable 505. Such method is possible because the interface cable usually contains plural ground lines. This method provides an advantage that the cable 505 need not be a special cable as shown in FIG. 4. Also the cable/wireless reception may be switched, when the interface cable is connected, in such a manner that the reception mode is switched to the cable mode when the wireless received data contain an error.

Figure 6:
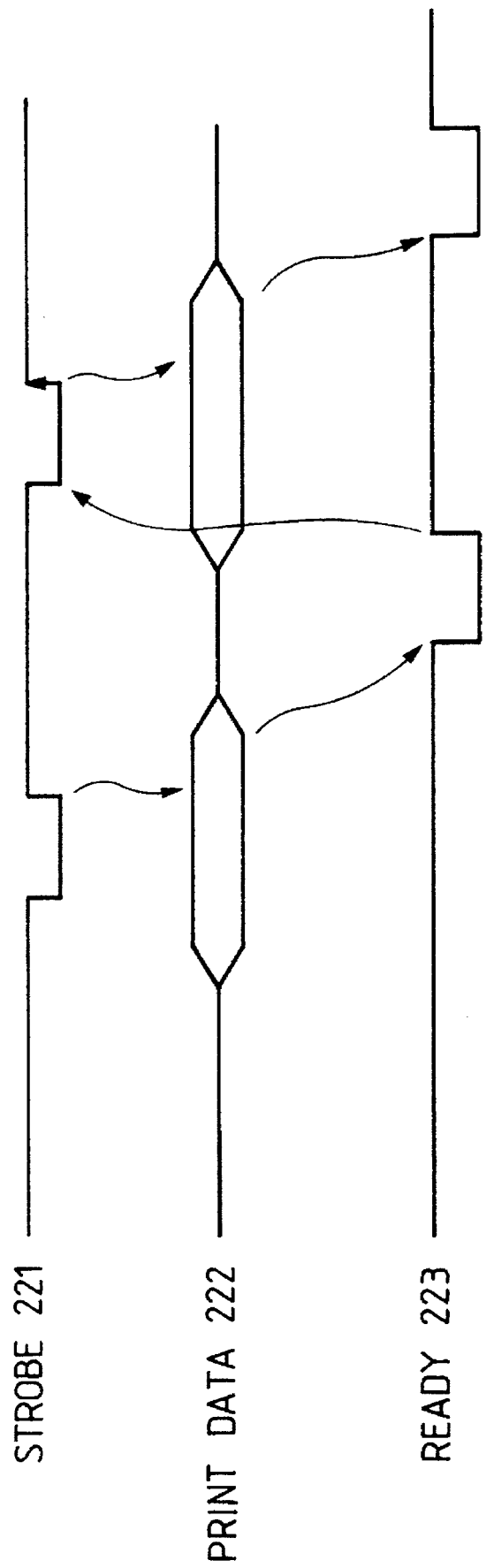
FIG. 6 is a timing chart showing signal exchange between the laser beam printer of said embodiment and a host computer.

FIG. 6 is a timing chart showing the timing of reception of printing data in the LBP 100 of the present embodiment.

The printing data 222 are sent from the host computer, in synchronization with a strobe signal 221. Said printing data 222 are latched by the latch circuit 208 of the cable transmission/reception unit 11 at the upshift edge of said strobe signal 221, and are subsequently supplied as printing data 126 to the input buffer 13. Upon completion of the storage of the entered printing data 126, said input buffer 13 sends back a pulse signal 125 to the cable transmission/ reception unit 11. Said pulse signal 125 is forwarded as a ready signal 223 from said cable transmission/reception unit 11 to the host computer, which, in response, identifies that the next data transfer is enabled and sends the next data to the cable transmission/reception unit 11.

If the input buffer 13 is incapable of storing the data transferred from the cable transmission/reception unit 11 for example because the input buffer 13 is full, the pulse signal 125 is not returned to the cable transmission/reception unit 11. Thus the ready signal 223 is not sent from the cable transmission/reception unit 11 to the host computer, which therefore enters a stand-by state for releasing the next data.

When the wireless transmission/reception unit 12 is selected for example by an instruction from the operation panel 300, the main control unit 18 shifts the signal 129 to the low level state, whereby the output of the AND gate 22 is shifted to the low level and the input selector 15 selects the output of the input buffer 14 for supply to the page memory 16.

Also when the operation panel 300 instructs an automatic selection mode, the main control unit 18 selects either of the input buffers 13, 14 that has at first stored the printing data of a page, based on signals 130,131 from said input buffers 13, 14.

FIG. 7 is a flow chart showing the above-explained control sequence of the main control unit 18, and a corresponding control program is stored in a program memory of the main control unit.

At first a step S1 discriminates whether the wireless reception is selected by the operation panel 300, and, in case of the wireless reception, the sequence proceeds to a step S5 for releasing a low-level signal on the signal line 129. On the other hand, in case the wireless reception is not selected, the sequence proceeds to a step S2 for discriminating whether the automatic selection mode has been selected. In case of the automatic selection mode, the sequence proceeds to a step S3 which selects either of the input buffers 13, 14, that has at first received and stored the printing data of a page. If a next step S4 identifies that the wireless received data in the input buffer 14 has reached one-page amount at first, the sequence proceeds to the step S5 to release a low-level signal on the signal line 129 for selecting the wireless received data, whereby the input selector 15 selects the data of the input buffer 14.

On the other hand, if the step S4 identifies that the wireless reception is not selected or if the cable reception is selected, the sequence proceeds to a step S6 for releasing a high-level signal to the signal line 129. Thus, when the interface cable 505 is connected to the cable transmission/ reception unit 11, a high-level signal is released to the signal line 130, whereby the input selector 15 selects the data of the input buffer 13 for storage in the page memory 16.

A next step S7 discriminates whether the page memory 16 has become full with the printing data of a page, and, when it has been full, a next step S8 develops said printing data into bit map data by referring to the character font memory 19, and stores thus developed data in the bit map memory 117. A next step S9 sends a print start signal 121 to the printing mechanism, and awaits the entry of a horizontal synchronization signal 122 therefrom. In response to the entry of said horizontal synchronization signal 123, a step S10 sends bit data of a line to the scan buffer 20 in synchronization with said signal. Then a step S11 discriminates whether the printing of a page has been completed, and, if not, the sequence returns to the step S9 for repeating the above-explained procedure. Said step S10 effects control in such a manner as to store the data of a next line in the buffer 202 while data are released from the buffer 201 as mentioned before, and to switch the data releasing buffer at every entry of the horizontal synchronization signal 122.

The present embodiment has been explained by a configuration employing a laser beam printer, but the present invention is not limited to such configuration and is applicable to any equipment that can effect wireless or cable exchange of data with an external equipment, such as a printer of other types, a display apparatus, a memory apparatus or a communication apparatus.

Also the present invention may be applied to a system consisting of plural equipment or to an apparatus consisting of a single equipment. Furthermore, the present invention is naturally applicable to a case in which the present invention is achieved by providing a system or an apparatus with a program attaining the present invention.

As explained in the foregoing, the present invention provides an advantage of instructing the data transmission/ reception by wireless or cable in a simple manner.

Also the present invention can reduce the trouble of interface switching, since the cable data reception is automatically selected when the interface cable is connected.

Also the main control unit 18 may execute a control program, stored therein, for control the display in order to display, by characters for symbols on the operation panel 300, whether the cable transmission/reception unit or the wireless transmission/reception unit is currently selected.

As explained in the foregoing, the present invention allows to use a wireless transmission/reception unit and a cable transmission/reception unit, and to automatically determine the unit to be used for data reception, according to whether the cable is connected to the cable reception unit.

Also according to another aspect of the present invention, the cable or wireless reception may be arbitrarily selected when the cable is connected.

What is claimed is:

1. A print control apparatus which receives print data from an information processing apparatus over one of a cable communication link and a wireless communication link, and which controls a printer to output image data based on the received print data, the print control apparatus comprising:

input means for inputting designation information for designating over which one of the cable communication link and the wireless communication link the print data is to be received;

determining means for determining which one of the cable communication link and the wireless communication link is designated by the designation information;

selecting means for selecting the print data received over the cable communication link when the determining means determines that the designation information designates the cable communication link, and for selecting the print data received over the wireless communication link when the determining means determines that the designation information designates the wireless communication link; and generating means for generating image data based on the print data selected by the selecting means.

2. A print control apparatus according to claim 1, wherein the print data comprises character code information and control code information.

3. A print control apparatus according to claim 1, wherein the cable communication link comprises an interface cable.

4. A print control apparatus according to claim 1, further comprising an operation panel having the input means disposed thereon.

5. A print control apparatus which receives print data from an information processing apparatus over one of a cable communication link and a wireless communication link, and which controls a printer to output image data based on the received print data, the print control apparatus comprising:

first memory means for storing print data received over the cable communication link;

second memory means for storing print data received over the wireless communication link;

selecting means for selecting the first memory means when the first memory means stores a predetermined amount of print data before the second memory means stores the predetermined amount of print data, and for selecting the second memory means when the second memory means stores the predetermined amount of print data before the first memory means stores the predetermined amount of print data; and generating means for generating image data based on the print data stored in the selected one of the first memory means and the second memory means.

6. A print control apparatus according to claim 5, wherein the print data comprises character code information and control code information.

7. A print control apparatus according to claim 5, wherein the cable communication link comprises an interface cable.

8. A print control apparatus according to claim 5, wherein the predetermined amount of print data is one page of print data.

9. A print control method, performed in a print control apparatus which receives print data from an information processing apparatus over one of a cable communication link and a wireless communication link and which controls a printer to print image data based on the received print data, the method comprising the steps of:

inputting designation information for designating over which one of the cable communication link and the wireless communication link the print data is to be received;

determining which of the cable communication link and the wireless communication link is designated by the designation information;

selecting the print data received over the cable communication link when the determining step determines that the designation information designates the cable communication link;

selecting the print data received over the wireless communication link when the determining step determines that the designation information designates the wireless communication link; and generating image data based on the print data selected in the selecting step.

10. A method according to claim 9, wherein the print data comprises character code information and control code information.

11. A method according to claim 9, wherein the cable communication link comprises an interface cable.

12. A method according to claim 9, wherein the input step includes inputting the designation information using an operation panel provided in the print control apparatus.

13. A print control method, performed in a print control apparatus which receives print data from an information processing apparatus over one of a cable communication link and a wireless communication link and which controls a printer to print image data based on the received print data, the method comprising the steps of:

selecting a first memory means when the first memory means stores a predetermined amount of print data before a second memory means stores the predetermined amount of print data;

selecting the second memory means when the second memory means stores the predetermined amount of print data before the first memory means stores the predetermined amount of print data; and generating image data based on the print data stored in the selected one of the first memory means and the second memory means.

14. A method according to claim 13, wherein the print data comprises character code information and control code information.

15. A method according to claim 13, wherein the cable communication link comprises an interface cable.

16. A method according to claim 13, wherein the predetermined amount of print data is one page of print data.

17. A printing apparatus which receives data from an external apparatus and prints the received data, said printing apparatus comprising:

a plurality of receiving means for receiving data from a plurality of external apparatuses;

printing means for printing data;

selecting means operable in an automatic selection mode, wherein in a case where the automatic selection mode is set, said selecting means selects data received by one of said plurality of receiving means which has received data earlier than all others of said plurality of receiving means, and wherein in a case where the automatic selection mode is not set, said selecting means selects data received by a designated one of said plurality of receiving means; and control means for controlling said printing means to print the data selected by said selecting means.

18. A printing apparatus according to claim 17, wherein the received data comprise at least one character code.

19. A printing apparatus according to claim 17, wherein each of said plurality of receiving means has an input buffer for storing the received data.

20. A printing apparatus according to claim 17, wherein said control means converts the selected data into an image and controls said printing means to print the converted image.

21. A printing apparatus according to claim 17, wherein at least one of said plurality of receiving means receives data via wireless communication.

22. A printing apparatus according to claim 17, wherein at least one of said plurality of receiving means receives data via cable communication.

23. A printing apparatus according to claim 17, further comprising an operation panel, wherein the automatic selection mode is set and the one receiving means is designated in response to an operation on the operation panel.

24. A printer controller used in a printer which receives data from an external apparatus and causes a printer engine to print the received data, said printer controller comprising:

a plurality of receivers for receiving data from a plurality of external apparatuses; and a processor operable in an automatic selection mode, wherein in a case where the automatic selection mode is set, said processor selects data received by one of said plurality of receivers which has received data earlier than all others of said plurality of receivers and controls the printer engine to print the selected data, and wherein in a case where the automatic selection mode is not set, said processor selects data received by a designated one of said plurality of receivers and controls the printer engine to print the selected data.

25. A printer controller according to claim 24, wherein the received data comprise at least one character code.

26. A printer controller according to claim 24, wherein each of said plurality of receivers has an input buffer for storing the received data.

27. A printer controller according to claim 24, wherein said processor converts the selected data into an image and controls the printer engine to print the converted image.

28. A printer controller according to claim 24, wherein at least one of said plurality of receivers receives data via wireless communication.

29. A printer controller according to claim 24, wherein at least one of said plurality of receivers receives data via cable communication.

30. A printer controller according to claim 24, wherein the printer has an operation panel and the automatic selection mode is set and the one receiving means is designated in response to an operation on the operation panel.

31. A data processing method carried out in a data processing apparatus which has a plurality of receivers for receiving data from a plurality of external apparatuses and which processes the received data, said method comprising the steps of:

selecting data received by one of the plurality of receivers which has received data earlier than all others of said plurality of receivers and processing the selected data in a case where the data processing apparatus is set in an automatic selection mode; and selecting data received by a designated one of the plurality of receivers and processing the selected data in a case where the data processing apparatus is not set in the automatic selection mode.

32. A method according to claim 31, wherein the received data comprise at least one character code.

33. A method according to claim 31, wherein each of the plurality of receivers has an input buffer for storing the received data.

34. A method according to claim 31, wherein both of said selecting steps convert the selected data into an image and control a printer engine to print the converted image.

35. A method according to claim 31, wherein at least one of the plurality of receivers receives data via wireless communication.

36. A method according to claim 31, wherein at least one of the plurality of receivers receives data via cable communication.

37. A method according to claim 31, wherein the automatic selection mode is set and the one receiver is designated in response to an operation on an operation panel of the data processing apparatus.

38. A program carried out in a data processing apparatus which has a plurality of receivers for receiving data from a plurality of external apparatuses and which processes the received data, said program being executable by a control unit in the data processing apparatus and being stored on a medium readable by the control unit, said program comprising:

a first selecting step to select data received by one of the plurality of receivers which has received data earlier than all others of said plurality of receivers and to process the selected data in a case where the data processing apparatus is set in an automatic selection mode; and a second selecting step to select data received by a designated one of the plurality of receivers and to process the selected data in a case where the data processing apparatus is not set in the automatic selection mode.

39. A program according to claim 38, wherein the received data comprises at lest one character code.

40. A program according to claim 38, wherein each of the plurality of receivers has an input buffer for storing the received data.

41. A program according to claim 38, wherein both of said first and second selecting steps convert the selected data into an image and control a printer engine to print the converted image.

42. A program according to claim 38, wherein at least one of the plurality of receivers receives data via wireless communication.

43. A program according to claim 38, wherein at least one of the plurality of receivers receives data via cable communication.

44. A program according to claim 38, wherein the automatic selection mode is set and the one receiver is designated in response to an operation on an operation panel of the data processing apparatus.

* * * * *